United States Patent
Hartley

(10) Patent No.: US 12,407,751 B1
(45) Date of Patent: *Sep. 2, 2025

(54) OPEN APPLICATION PROGRAMMING INTERFACE SPECIFICATION BASED APPLICATION PROGRAMMING INTERFACE PROXY

(71) Applicant: THE HUNTINGTON NATIONAL BANK, Columbus, OH (US)

(72) Inventor: James Hartley, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/056,257

(22) Filed: Feb. 18, 2025

Related U.S. Application Data

(63) Continuation of application No. 18/824,054, filed on Sep. 4, 2024, now Pat. No. 12,261,902.

(51) Int. Cl.
| | | |
|---|---|---|
| *H04L 67/02* | (2022.01) | |
| *H04L 9/40* | (2022.01) | |
| *H04L 67/56* | (2022.01) | |

(52) U.S. Cl.
CPC .......... *H04L 67/02* (2013.01); *H04L 63/0281* (2013.01); *H04L 67/56* (2022.05)

(58) Field of Classification Search
None
See application file for complete search history.

(56) References Cited

U.S. PATENT DOCUMENTS

| | | | |
|---|---|---|---|
| 9,930,103 B2 * | 3/2018 | Thompson | H04L 67/10 |
| 10,623,476 B2 * | 4/2020 | Thompson | H04L 67/561 |
| 2005/0165902 A1 * | 7/2005 | Hellenthal | H04L 67/04 |
| | | | 709/217 |
| 2014/0301739 A1 * | 10/2014 | Yu | H04B 10/11 |
| | | | 398/130 |
| 2015/0186193 A1 * | 7/2015 | Jain | G06F 9/541 |
| | | | 719/328 |
| 2016/0088023 A1 * | 3/2016 | Handa | H04L 67/02 |
| | | | 709/219 |
| 2018/0309819 A1 * | 10/2018 | Thompson | G06F 9/547 |
| 2020/0125700 A1 * | 4/2020 | Chang | G06F 21/6218 |
| 2020/0236187 A1 * | 7/2020 | Tal | H04L 63/0281 |
| 2021/0064453 A1 * | 3/2021 | Bahrami | G06F 16/986 |
| 2024/0430238 A1 * | 12/2024 | Rossetti | H04L 63/0884 |

* cited by examiner

*Primary Examiner* — Lashonda Jacobs-Burton
(74) *Attorney, Agent, or Firm* — Kilpatrick Townsend & Stockton LLP

(57) ABSTRACT

Techniques are described for generating an API proxy and backend implementation. An example method can include accessing computing resource modeling information and data element relationship modeling information. The method can further include generating an API outline comprising a field identifier and a field definition. The method can further include generating an OAS document comprising information for defining an application programming interface proxy. The method can further include accessing API proxy information from the open application programming interface specification document. The method can further include generating an API proxy based at least in part on the API proxy information, the API proxy operable for accessing information based at least in part on the field identifier or the field definition.

20 Claims, 7 Drawing Sheets

400

```
openapi: 3.0.0                                                                104
info:
  title: Inventory API Proxy
  version: 1.0.0
  description: API Proxy for managing a digital inventory
  contact:
    name: Inventory Team
    email: inventory@example.com
servers:
  - url: https://api.example.com/v1
paths:
  /inventory:
    get:
      summary: Retrieve all inventory items
      operationId: getInventory
      responses:
        '200':
          description: A list of inventory items
          content:
            application/json:
              schema:
                type: array
                items:
                  $ref: '#/components/schemas/InventoryItem'
    post:
      summary: Add a new inventory item
      operationId: addInventoryItem
      requestBody:
        required: true
        content:
          application/json:
            schema:
              $ref: '#/components/schemas/InventoryItem'
      responses:
        '201':
          description: Inventory item created successfully
        '400':
          description: Invalid input
        '500':
          description: Internal server error
```

Base URL:                                                                 218
  resource id: https://api.example.com/v1
info:
  title: Inventory API Proxy
  version: 1.0.0
  Module name: Inventory manager
  singular name of resource: item
  plural name of collection: items
  description: API Proxy for managing a digital inventory

Endpoints:
  Add New Inventory Item
  URL: /inventory
  Method: POST
  Description: Add a new inventory item to the system.
  Request Body: Inventory item object
  Response:
  Status Code: 201 Created if inventory item is successfully added
  Status Code: 400 Bad Request if request body is invalid
  Status Code: 500 Internal Server Error if server encounters an error

Data Model:
  json
    {
    "invenId" "string",
    "invenName": "string",
    "invenQuantity": "integer",
    "invenPrice": "number"
    }

Authentication:
  The API Product requires authentication using API Product keys. Each request must include a valid API Product key in the headers for authentication.

Error handlings:
  The API Product returns appropriate HTTP status codes along with error messages in case of errors, such as
    '400 Bad request' or '500 Internal Service Error'.

FIG. 5

OPEN APPLICATION PROGRAMMING INTERFACE SPECIFICATION BASED APPLICATION PROGRAMMING INTERFACE PROXY

CROSS-REFERENCE TO RELATED APPLICATION

This application is a continuation of U.S. patent application Ser. No. 18/824,054, now U.S. Pat. No. 12,261,902, filed Sep. 4, 2024, the entirety of which is hereby incorporated by reference.

BACKGROUND

An application programming interface (API) can include intermediary software that enables software applications to communicate with one another. For example, an API can include instructions and protocols that allow one application to access the data and functionality of another application. An API can provide interoperability between applications, facilitate integrations between services, and enhance user experience.

BRIEF DESCRIPTION OF THE DRAWINGS

Various embodiments in accordance with the present disclosure will be described with reference to the drawings, in which:

FIG. 4 is an illustration of an example OAS document, according to one or more embodiments.

FIG. 5 is an illustration of an example API outline, according to one or more embodiments.

DETAILED DESCRIPTION

Figure 1:
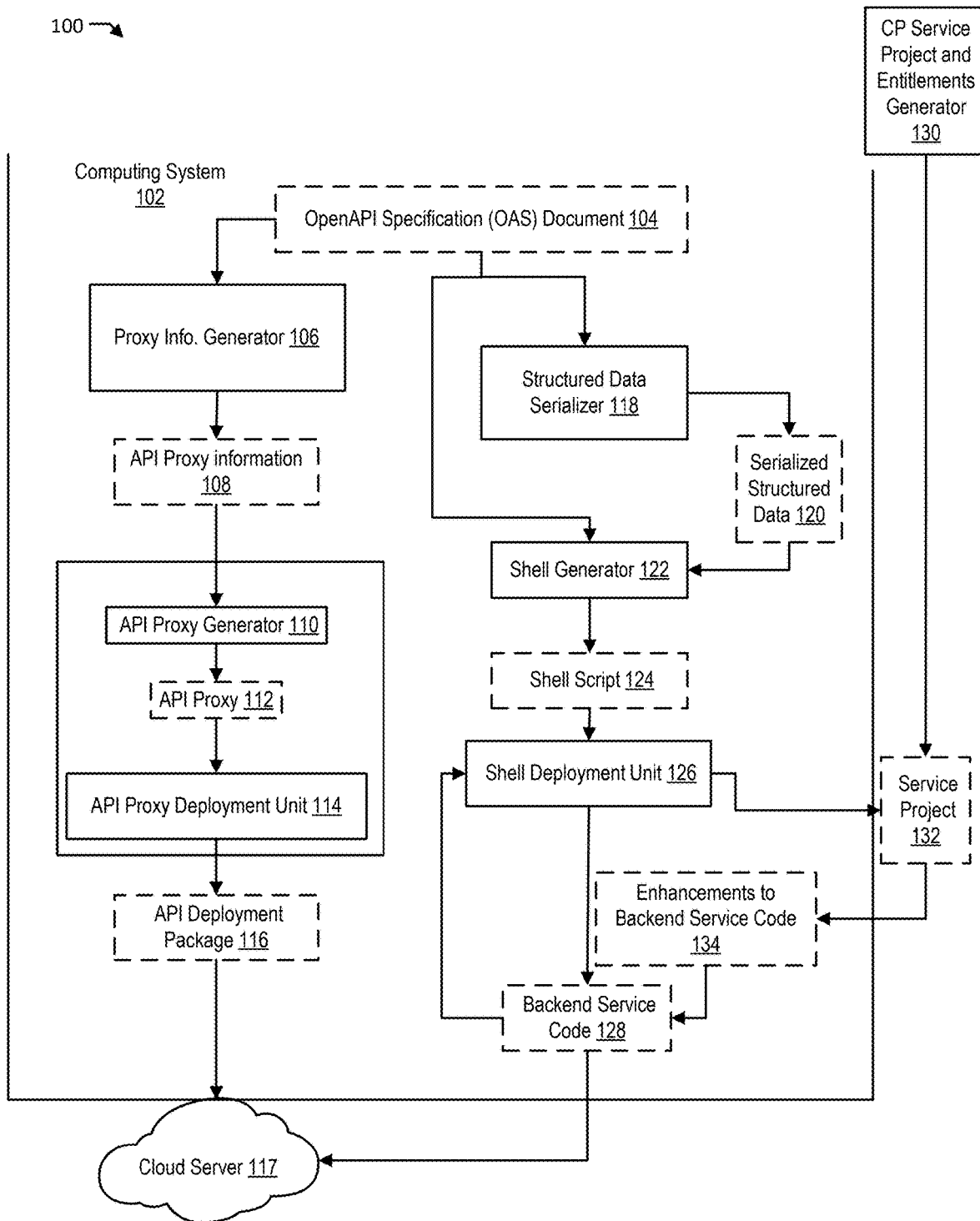
FIG. 1 is an illustration of an example computing system for generating an application programming interface (API) proxy and backend service code, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to generating an application programming interface (API) proxy. The herein-described techniques can be standardized, such that the techniques enable a computing system to process different inputs to generate different API proxies. The herein-described techniques for generating the API proxy are also repeatable, such that the computing steps can be performed multiple times to consistently generate standardized API proxies. The herein-described computing steps can be replicated using different inputs and still generate standardized APIs based on the inputs. The repeatability of the herein-described computing steps can be important because it enables different entities (e.g., departments of an enterprise) to individually perform the same steps with different inputs and still generate standardized API proxies.

To illustrate an example, the enterprise can encompass multiple departments that each have distinct computing needs. Even if the enterprise uses a common computing service, each department may need the service to perform a different function. For example, a financial institution may use a database service for logging employee information. The enterprise's human resources department may need to associate employee names with their job title for organizational tracking, whereas the accounting department may need to associate the employee names with their residency for tax purposes. Furthermore, employee data may be stored in an employee database, however, other employee-related information relating to employees moving, switching roles, or other changes may be stored in other databases. An API can be used to enable the department's computing device, such as a laptop, personal computer, or mobile device to communicate with one or more of the databases.

In some instances, the enterprise can use an API proxy that acts as an intermediary between a frontend service and a backend API for a backend service. For example, an application can make a call using a frontend service (e.g., web-based application) for data from the backend service. Rather than the frontend service contacting the backend API, the frontend service can communicate with an API proxy. The API proxy can communicate with the backend API to request the data.

The API proxy can provide various technical benefits to the enterprise's computing system. In many instances, a backend service includes a data center that is built on legacy services that may not be compatible with more modern software. Therefore, by using the API proxy, the frontend services can undergo code changes and continue to communicate with the backend service via the API proxy. Furthermore, even if the backend service undergoes code changes, the frontend services can still make requests to the backend service via the API proxy. The API proxy can be a less complicated software with less functionality than the front service or the backend service. Therefore, any code changes to the API proxy can be less burdensome than code changes to the frontend service, backend API, or backend service.

To be useful to an enterprise, an API proxy generation technique may be agnostic to the received inputs, automated, and be repeatable by each of the enterprise's departments. The API proxy generation technique should permit each department to apply its desired policy for the API proxy. For example, one enterprise department may have one set of rules for their computing service instance and another enterprise department may have a different set of rules for their computing service instance. One issue for the enterprise's information technology department may be to determine how to automate a repeatable process for generating API proxies. Furthermore, the API proxies need to satisfy the needs of each enterprise department.

The herein-described techniques address these issues by providing an automated and repeatable process for generating an API proxy that can be used by any enterprise department. A computing system can receive information as to a desired API proxy. The computing system can further use this information to model the computing resources that will be used to enable the functionality of the API proxy. The computing system can further model relationships between data elements that will be accessed by the API proxy. This information can be used to generate an API outline, which provides a general description of the API proxy. The API outline can be used by the computing system to generate an open application programming interface specification (OAS) document that provides further details about the API proxy. The computing system can extract relevant information from the OAS document to generate an API proxy and relevant software code for a backend service with which the API proxy is intended to communicate.

The techniques disclosed herein provide several technical advantages over conventional techniques. The herein-described techniques describe a computing system that can execute a repeatable API proxy generation process. The automated process can receive an API description as an input and output an API proxy and backend service code with which the API proxy is to communicate. Therefore, rather than manually performing intermediate steps in an API proxy generation process, the herein-described techniques describe automation of this process. One advantage to using an automated process over a manual process is a reduction in errors and development time. A manual process can require extensive manual data entry (e.g., using user interfaces, data entry fields, and other computing elements), which can be prone to errors. These errors can lead to an increase in development time due to having to perform a debugging process to remove the errors. In addition to improving efficiency, the herein-described techniques can improve the security of a computing system. As the herein-described automated process can limit the use of manual data entry for API proxy and backend service generation, the API proxy and backend service code are more secure as there are fewer opportunities for a user to introduce a security vulnerability accidentally or intentionally. The API proxy and the backend service can collectively be considered an API implementation that can improve the enterprise's computing system.

The herein-described techniques also help reduce redundancy and conserve resources for an enterprise's computing systems. For example, the herein-described techniques described repeatable computing techniques that can be used by each of the departments across the enterprise to generate a respective standardized API proxy for each department. Therefore, rather than have each department using computing resources, memory, and network bandwidth while using their own techniques to generate API proxies and backend service code, the departments can use standardized techniques described herein to generate API proxies and backend service code. As each department uses the same standardized techniques and computing system, redundancy can be reduced and a better conservation of resources can be achieved as well.

In addition, as the API proxies are standardized, any issues may be common throughout the API proxies. Therefore, fewer computing resources and human resources may be required for a debugging process, as the solution to an issue for an API proxy may have already developed in relation to another API proxy.

Furthermore, the herein-described techniques are repeatable, such that the same process steps can be used to generate different API proxies. As indicated above, the computing system can use a description of a desired API to model computing resources and data elements. This information is used to generate an API outline, and subsequently an OAS document. The description of the desired API can be different for each enterprise department. As the desired API is different, the computing resource and data element modeling may also be different. This can result in a different API outline, and subsequently a different OAS document. As the OAS document is different, the API proxy would also be different. Therefore, rather than having to configure a new process for each enterprise department, the same process can be repeated to generate different API proxies.

Figure 2:
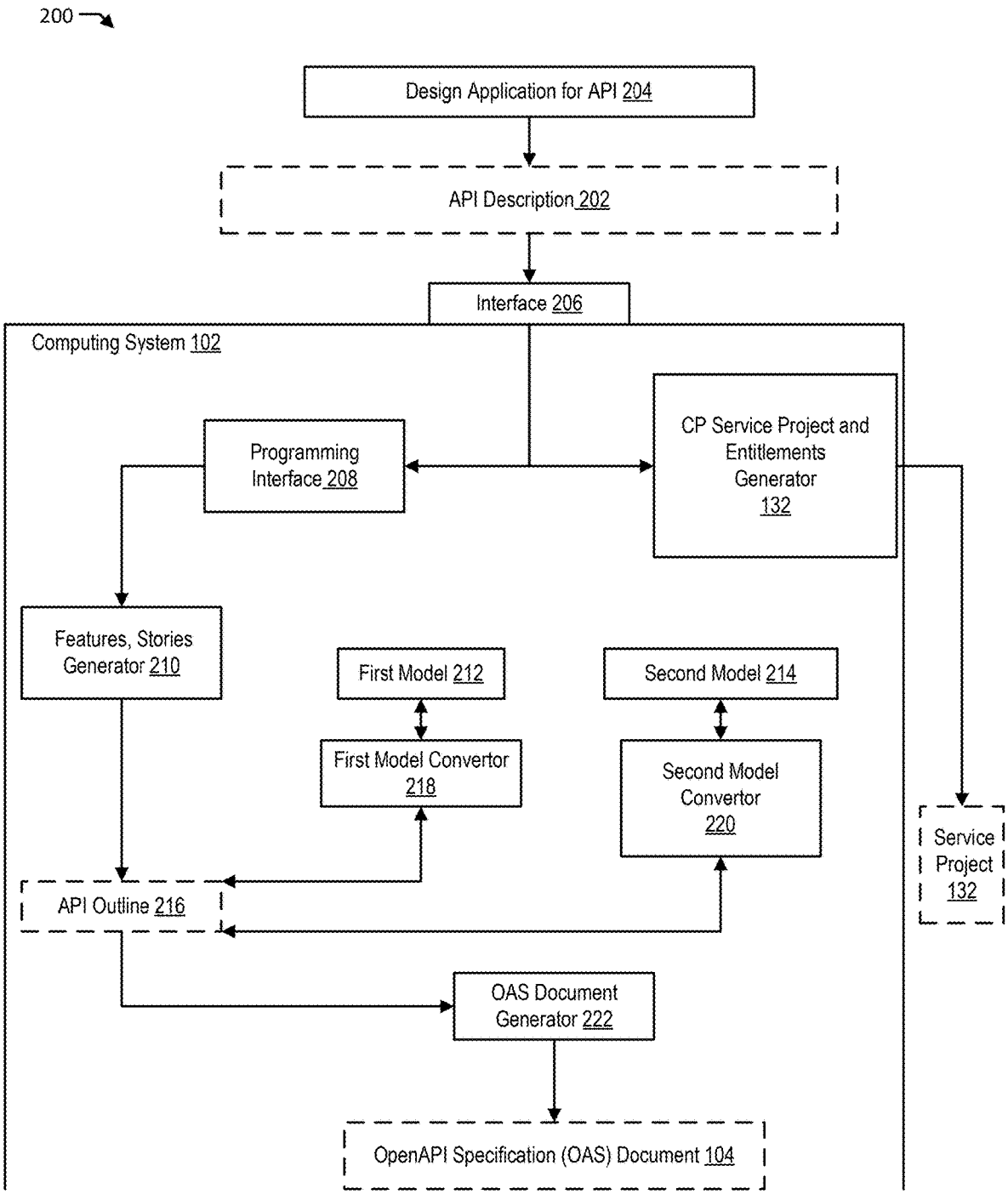
FIG. 2 is an illustration of an example computing system for generating an API proxy and backend service code, according to one or more embodiments.

FIG. 1 and FIG. 2 describe a computing system used to generate an API proxy. FIG. 1 focuses on the portion of the computing system that generates an API proxy and backend service code using an open application programming interface speciation (OAS) document. FIG. 2 focuses on the portion of the computing system that generates the OAS document that is used in FIG. 1.

Turning now to FIG. 1 in more detail, FIG. 1 is an illustration of an example computing system for generating an application programming interface (API) proxy and backend service code, according to one or more embodiments. A computing system 102 (e.g., an enterprise's computing system) can be configured to generate an API proxy and backend service code. The system 102 can be implemented by a software engine, referred to as an "API proxy generation engine 714" in FIG. 7. The API proxy engine 714 can be configured to perform the functionality for generating the API proxy and backend service code as described herein. In general, the API proxy engine 714 can receive information to be used to generate an API outline (e.g., API outline 216 of FIGS. 2 and 5). The information used to generate the API outline 216 and an example API outline 216 are described with more particularity with respect to FIGS. 2 and 5. The API proxy engine 714 can further use the API outline 216 to generate an OAS document (OAS document 104), which can include information to be used to generate the API proxy and backend service code. An example OAS document is described in more particularity with respect to FIG. 4. The API proxy generator 714 can further use the OAS document to generate the API proxy and backend service code. A process to generate the API proxy and backend service code is described with more particularity with respect to FIGS. 1 and 6.

The API proxy can include intermediary software for a frontend API to communicate with a backend API for a backend service. The computing system 102 can process an open application programming interface specification (OAS) document 104, which can define an API structure (e.g., a RESTful API) in a particular format. The OAS document 104 can be written in either Javascript Object Notation (JSON) or yet another markup language (YAML), also known as YAML Ain't Markup Language. The OAS document 104 can be a single document or multiple documents. For example, in some instances, the OAS document is organized as a tree structure in which a root document is connected to one or more leaf documents. An example of an OAS document 104 is provided with respect to FIG. 4.

The OAS document 104 can include various sections, such as an information section that includes API information, such as the OAS version used to generate the OAS document 104; API metadata, such as an API title, and API description, terms of service, API licensing information and other relevant information; and an external documents section for links to relevant external documents. The OAS document 104 can also include a server section and paths section. The OAS document 104 can identify one or more servers that are hosting or will host an API or API proxy. The OAS document 104 can further indicate tags that are used to group operations together based on using common resources. The OAS document 104 can include a components section that can define models and reusable components, such as request bodies, responses, schemas, and other reusable components. The OAS document 104 can further include a paths section that defines API endpoints. For example, the paths section can define a uniform resource identifier (URI), hypertext transfer protocol (HTTP) methods, parameters, and other path related information.

The OAS document 104 can include information that is used to generate an API proxy and backend service code 128, where the backend service code 128 includes code for a backend service implementation. For example, the backend service code 128 can include code for the backend server API to handle communication from the API proxy. The computing system 102 can execute operations in parallel to generate the API proxy and the backend service code 128. For example, the computing system 102 can execute a first set of operations to generate the API proxy along a first path and a second set of operations to generate the backend service code 128 along a second path.

The computing system 102 can use the first path to generate the API proxy. In some instances, the OAS document 104 can include more information than is necessary to generate the API proxy. Therefore, the computing system can perform operations to identify the information in the OAS document 104 that is useful to generate the API proxy. The computing system 102 can include a proxy information generator 106 along the first path. The proxy information generator 106 can access the OAS document 104, which can be in a JSON or YAML format. The proxy information generator 106 can tokenize the information included in the OAS document 104. The proxy information generator 106 can then parse through the tokenized information to identify patterns, relationships, and structures in the information. For example, the proxy information generator 106 can identify the information section, the server section, the components section, and paths section. The proxy information generator 106 can be configured to identify the information from the OAS document (e.g., information from each of the sections) that can be used to generate the API proxy.

The relevant information can be based on a particular backend service with which the API proxy is to communicate. The relevant information from the OAS document 104 can further be based on the one or more tasks that are to be performed by the API proxy. For example, the relevant information can include an endpoint that corresponds to a particular backend service that stores information. In another example, the relevant information can include a schema that indicates the properties of a resource that the API proxy may access. As each API proxy is customizable based on the desired features, the relevant information can be based on the tasks that the API proxy is to perform. Therefore, the information that is relevant to generate one API proxy may be different than the information that is relevant to generate another API proxy. However, the process to generate the API proxy is repeatable regardless of the intended tasks that the API proxy is to perform.

The proxy information generator 106 can structure the information. For example, the proxy information generator 106 can structure the information as a tree structure, a table, a JSON object, or YAML format. The YAML format includes structuring the information using YAML, which is a human-readable data serialization language. A YAML file can include a set of data structures that are represented as strings. The data structures can be formed from various components, such as scalars, lists, dictionaries, documents, and comments. The proxy information generator 106 can transmit the proxy information 108 to an API proxy generator 110.

The API proxy generator 110 can use the API proxy information 108 to generate an API proxy 112. The API proxy 112 can be a thin-layer application that is an intermediary between a frontend service API and a backend service API. The API proxy 112 can include extensible markup language (XML) and code, such as JavaScript or Java for performing one or more tasks. The API proxy 112 can be a standard proxy or an extensible proxy. A standard proxy can include standard policies that are suitable with any environment type. An extensible proxy can include one or more extensible policies, where an extensible policy includes additional functionality (e.g., traffic management, mediation, and security) over a standard policy. Whether standard or extensible, a policy can be code enabling one or more functionality for the API proxy. An extensible proxy may be more suitable for a more comprehensive environment than the standard proxy. Therefore, an extensible proxy can include more functionality than a standard proxy. An API proxy 112 is described with more detail with respect to FIG. 3.

An example process for the API proxy generator 110 to generate the API proxy 112 can be for the API proxy generator 110 to use the API proxy information 108 to identify any APIs with which the API proxy 112 is to communicate. The API proxy generator 110 can then map a workflow in which the API proxy 112 is to participate. The API proxy generator 110 can then select a development model that can include a language and data structures used to generate the API proxy 112. If the API proxy is to be hosted on a platform, the development model should be compatible with the platform. One method can be to select a combination of language and data structures that are the most compatible with the frontend service and the backend service. The API proxy generator 110 can then determine one or more policies (e.g., standard policies or extensible policies) for the API proxy 112. The API proxy generator 110 can use the API proxy information 108 to determine the one or more policies. The API proxy generator 110 can then generate the code for the API proxy 112 based on the API proxy information 108, the language, data structures, and policies. It should be appreciated that various other pieces of information can be used to generate the API proxy 112. The API proxy generator 110 can then store the API proxy 112 in a read-only repository.

An API proxy deployment unit 114 can access the API proxy 112. For example, the API proxy deployment unit 114 can access the API proxy 112 from the read-only repository. The API proxy deployment unit 114 can further deploy the API proxy 112 as an API deployment package 116, where an API deployment package 116 can include an API proxy 112 that is available for use. For example, the API proxy deployment unit 114 can activate one or more endpoints (e.g., URLs) for accessing the API proxy 112. In some instances, the API proxy deployment unit 114 can be deployed to an internal portal where an API owner (e.g., enterprise department) can test the API deployment package 116. Once the API owner approves the API deployment package 116, the API proxy deployment unit 114 can store the API deployment package 116 on a cloud server 117 to be accessible via the one or more activated endpoints. Once the API deployment package 116 is stored on the cloud server 117, a frontend service can use the API deployment package 116 to communicate with a backend service.

The computing system 102 can use a second path to generate the backend service code 128. The second path can begin at a structured data serializer 120 (e.g., Google Protocol Buffer mechanism) that can access the OAS document 104. The structured data serializer 120 can be a language agnostic data serialization mechanism that can use the OAS document 104 to define structured data and generate serialized structured data 120. The serialized structured data 120 can define a schema intended for the API proxy 112. The serialized structured data 120 can be used to generate source code that can read and write the structure data from various data streams. For example, the computing system 102 can use a compiler to process the serialized structured data 120 and generate client side (e.g., frontend service) code and backend service code 128. The backend service code 128 can be written, for example, using Java, Ruby, Go, Python, C++, Dart, or other appropriate language. In some instances, the language can be selected based on the compatibility with the backend service. In some embodiments, the computing system 102 can generate the serialized structured data 120 in the form of an executable file that includes the code. Data serialization can include a process of converting a complex data structure (e.g., OAS document 104) into an extensible format (e.g., stream) that is more amenable than the complex data structure to being transmitted, stored, or reconstructed.

The computing system 102 can access the serialized structured data 120 and provide it to a shell generator 122. The shell generator 122 can generate a shell script 124 to be used to invoke the API proxy 112 after it has been deployed to the cloud server 117 (e.g., the API deployment package 116) or in a testing environment. The shell generator 122 can use an integration platform to generate the shell script 124. The integration platform can assist generating code for routing data to different backend services, such as software as a service (SaaS) platforms. The integration platform can be used to define endpoints (e.g., URLs) that an API proxy 112 may need to reach in order to satisfy a request from a client device. The integration platform can include various pre-configured solutions for integrating various enterprise computing systems. Therefore, the shell script 124 can incorporate pre-written code from the integration platform as a solution based on an enterprise's specific situations and expected needs.

The shell generator 122 can use an automated API testing framework platform (e.g., Karate framework) to evaluate the shell script 124 and the API proxy 112. The automated API testing framework platform can be used, for example, to determine security functionality, determine reliability, evaluate features, determine whether any runtime errors occur in various testing scenarios for the shell script 124 and the API proxy 112. For example, the automated API testing framework platform can have an automated process for generating testing suites to test the shell script 124 and the API proxy 112. Each testing suite can process multiple requests for testing aspects of the shell script 124 and the API proxy 112. If the shell script 124 and the API proxy 112 do not perform to an acceptable standard based on the automated API testing framework platform, either the shell generator 122 can generate a new shell script 124 or the API proxy generator 110 can generate a new API proxy 112. In some instances, one or more enterprise departments may request one or more enhancements for the shell script 124. In these instances, the shell generator 122 can regenerate a shell script 124 that incorporates the requested enhancements.

If the shell script 124 and the API proxy 112 perform to an acceptable standard based on the automated API testing framework platform, a shell deployment unit 126 can access the shell script 124. The shell deployment unit 126 can be a serverless service for containerized applications (e.g., Google Cloud Run) that can provide a managed infrastructure for storing the shell script 124 on the cloud server 117. The shell deployment unit 126 can run stateless containers that store the shell script 124 and allow a user to invoke the shell script 124. For example, a user can use a computing device to make an HTTP request for the API deployment package 116 and the shell script 124 can be invoked for connecting the user to the API deployment package 116. The containerized applications service can be integrated with a database service (e.g., Google Bigtable). The database service can include a table for storing data, such as key-value pairs. The data in the tables can be stored in rows, where each row has a unique identifier. The data can be organized by column, where a column includes an identifying header. In some instances, the API deployment package 116 may be called to retrieve data from various sources. The API deployment package 116 can contact multiple backend sources and make requests for data from each of them. The data received from the different sources can be stored on the table of the database service. The shell deployment unit 126 can output the backend service code 128, which can include the shell script, the stateless container, and the table. The backend service code 128 can be stored on the cloud server 117.

In some instances, an enterprise can use a cloud platform service project and entitlements generator 130 to generate a service project 132. It should be appreciated that although the cloud platform service project and entitlements generator 130 is illustrated as a computing system that is distinct from the computing system 102, in some instances, the cloud platform service project and entitlements generator 130 is part of the computing system 102. The cloud platform can provide storage capabilities, networking capabilities, machine leaning capabilities, and other capabilities. The cloud platform can include cloud platform instances in various regions (e.g., North America, Europe, Asia, California, Virginia, London, and Sydney). The service project 132 can be code that is created to help manage the API deployment package 116. For example, the service project 132 can be used to specify which regions the API deployment package will be available to access. The service project 132 can also be used to specify which backend services can be accessed via the API deployment package 116. For example, the API deployment package 116 may be available in regions A and B, but not in region C. Furthermore, backend services 1, 2, and 3 may be available via the API deployment package 116 in region A, but only backend service 1 and 2 are available in region B. The service project 132 can further be used to set up a development environment, integration environment, and a sandbox (e.g., isolated testing environment). The service project 132 can further be used to set configurations for the containerized applications service and the database service. The service project 132 can further be used to set up read and write entitlements for various users that may be inspecting the code.

In some instances, the service project 132 includes enhancements to the backend service code 134. For example, after testing or using the API deployment package 116 or after a need arises, an enterprise department may use the cloud platform project and entitlements generator 130 to request one more enhancements. The cloud platform project and entitlements generator 130 can be in communication with a database that can store information used to generate code for enhancement. The database can be a configuration management database (CMDB) described with more particularity with respect to FIG. 2. An enhancement can be considered an additional API deployment package feature, modification of an API deployment package feature, or removal of an API deployment package feature. The enhancements to the backend service code 134 can include, for example, generating an endpoint for the database. The enhancement to backend service code 134 can be used to update the backend service code 128 to suit the needs of the enterprise. The enhancement to backend service code 134 can also include an enterprise department's policy that is to be implemented in the backend service code 134. In some instances, the policy can be received prior to generation of the backend service code 128. In these instances, the policy can have been incorporated into the backend service code 128. In other instances, the policy can be received after the generation of the backend service code 128. In these instances, the policy may not have been incorporated into the backend service code 128. Therefore, the shell deployment unit 126 can generate a new backend service code 128 that incorporates the policy.

FIG. 2 is an illustration of an example computing system for generating an application programming interface proxy and backend service code, according to one or more embodiments. A computing system 102 can receive an API description 202 generated by a design application for API 204. The computing system 102 can be the same computing system 102 of FIG. 1 or a different computing system. For example, the computing system 102 of FIG. 1 and the computing system FIG. 2 can be computing systems that are part of a distributed computing environment. The API description 202 can include, for example, the technology to be used to build an API proxy, what resources are available for the API proxy, functionality for an API proxy, a name of an API proxy, a description of an API proxy, API proxy fields, API proxy definitions, API proxy relationships, or other appropriate information.

As illustrated, the CP service and entitlements generator 130 can also use the API description 202 to generate the service project 132 as described with respect to FIG. 1.

A features, stories generator 210 can access the information from the API description 202 to generate a description of features and stories. Features can be various features that are to be included in the API proxy 112 and the API deployment package 116. Stories can be natural language description of stakeholder understanding of the API proxy 112 and the API deployment package 116. For example, the features, stories generator 210 can access or include a large language model that can be trained to access the API description 202 to generate natural language descriptions of features to be included in the API proxy 112 or API deployment package 116.

The features, stories generator 210 along with a first model 212, and a second model 214 can be used to generate an API outline 216. The first model 212 can be a visualization model for software architecture and be a unified modeling language (UML) compliant (e.g., a Sparx EA model). The first model 212 can be used to generate different architectural views for modeling the API proxy 112 or API deployment package 116. The API outline 216 can include various components, such as descriptions of resources. These resources can be represented (e.g., using representations of objects) using UML, making the first model 212 useful for generating the API outline 216. The first model 212 can be used to model the resources, and then the model the paths to the resources. For example, the first model 212 can be used to generate a path diagram for paths for resources to be used by the API proxy 112. The visualizations of the resources and the paths can map to information in the API outline 216. The first model convertor 218 can include a parser that can parse information that is included in the visualizations and is to be included in an API outline 216. The first model convertor 218 can further extract the information from the first model 212, which the computing system 102 can use to generate the API outline 216.

The second model 214 can be a data model (e.g., a Quest Erwin data model). The second model 214 can be used to generate visualizations of data elements and the relationship between these data elements. A data model can be used by an enterprise to manage its information technology resources. For example, the second model 214 can be used to visualize and design a database to be accessed by the API proxy 112. The second model 214 can incorporate an enterprise's data architecture best practices, and generate visualizations indicating whether the best practices are being followed. Furthermore, the data visualizations of can map to information in the API outline 216. Changes to the API outline 216 can be visualized via the second model 214, and changes to the visualization can be reflected in the API outline 216. This can result in bi-directional lossless conversion of the model to support one or more intended OAS document schemas. The second model convertor 220 can further extract the information from the second model 214, which the computing system 102 can use to generate the API outline 216.

The API outline 216 can be a collection of information that may be useful to generate the OAS document 104. An example API outline 216 is described with respect to FIG. 5. The API outline 216 can include various pieces of information, including a full API name and version, a backend services code name, a singular name of s resource identifier, a plural name of a collection of resources, a resource identifier, example JSON script, field names, definitions, and relationships. The computing system 102 can generate the API outline 216 in various formats (e.g., YAML JSON, comma separated values (CSV), or other appropriate format). The API outline 216 can be useful as a resource document or collection of resource documents that can be accessed for information to be used to generate the OAS document 104. Therefore, rather than having to search for information to be used in an OAS document across multiple sources, the API outline 216 includes all of the information to be used to generate the OAS document 104.

An OAS document generator 222 can access the API outline 216 and generate the OAS document 104. The OAS document generator 222 can include software that is configured with the open API specification. The OAS document generator 222 can further store the OAS document 104 in a repository. An example OAS document 104 is described with respect to FIG. 4.

Figure 3:
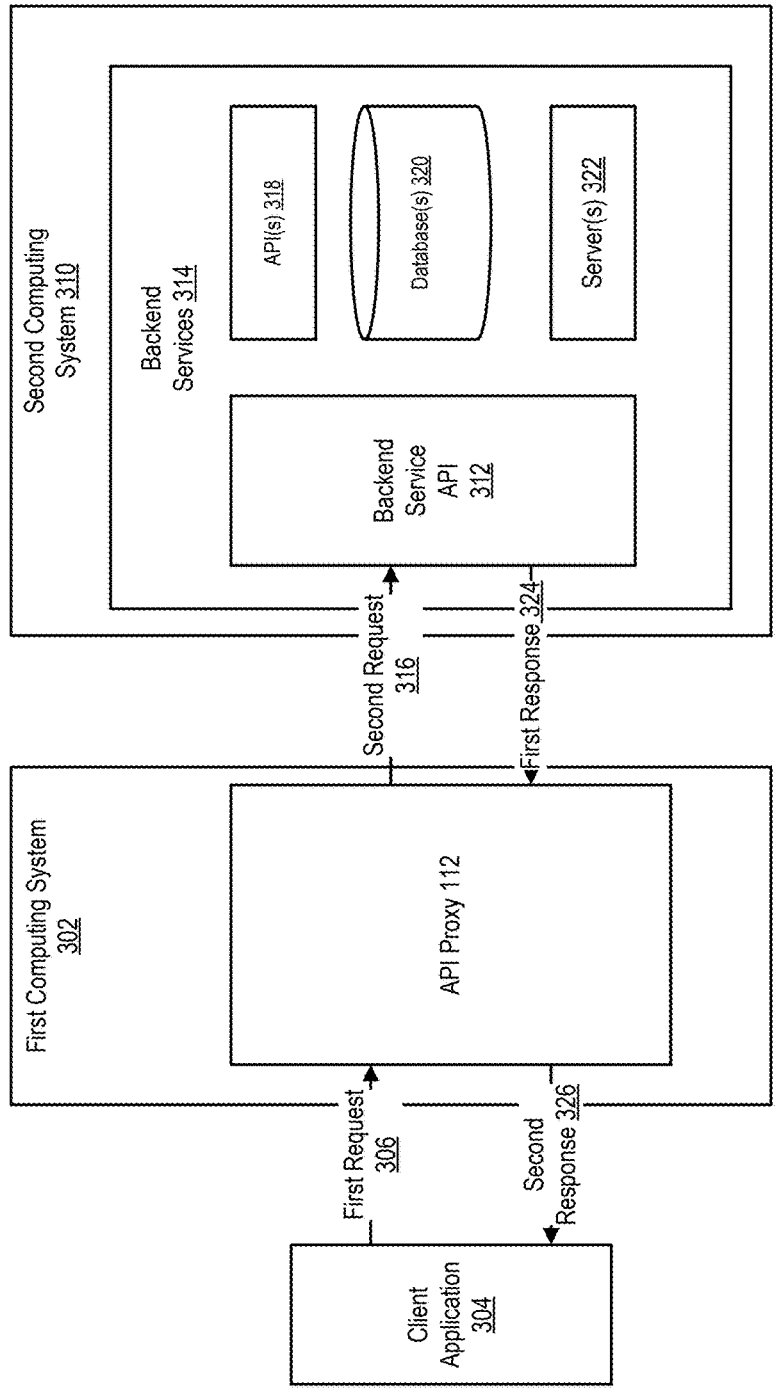
FIG. 3 is an illustration of an example use case for an API proxy, according to one or more embodiments.

FIG. 3 is an illustration 300 of an example use case for an API proxy, according to one or more embodiments. A computing system 302 can be in communication with a client application 304 (e.g., frontend service). The client application 304 can transmit a first request 306 to the computing system 302. The first request 306 can be for some functionality, for example, to access data stored at the computing system's backend services 308. The computing system 302 can be a cloud-based distributed computing system that includes the API deployment package 116 generated by the computing system 102 of FIG. 1. The first request 306 can be received by the API deployment package 116 that acts as an intermediary between the client application 304 and a backend service API 308. Although a single backend service API 308 is illustrated, in a practical application, each backend service of an enterprise can be associated with a respective backend service API. The API deployment package 116 can convert the format of the first request 306 to a request that is amenable to the backend service API 308. As the API deployment package 116 can be designed based on input from one or more departments of the enterprise, the API deployment package 116 may have additional features, such as a security feature, a notification feature, or other desired feature. The features included in the API deployment package 116 can have been defined in the OAS document 104. The API deployment package 116 can transmit a second request 310 to the backend service API 308. The path that the API deployment package 116 uses, including any endpoints to reach the backend service API 308 can have been defined in the OAS document 104. Based on the second request 310, the backend service API 308 can communicate with or more computing elements to satisfy the request. For example, the backend service API 308 can communicate with other APIs 312, one or more databases 320, one or more servers 316, or other computing element. Regardless of the computing element that the banked service API 308 communicates with, a first response 318 can be transmitted back to the API deployment package 116. The first response 318 can be based on the second request 310. For example, if the second request 310 was for data from a database 320, then the first response can include the data. A first response 318 that includes a data request is an example, and it should be appreciated that a person having ordinary skill in the art can contemplate other responses to other types of requests. The API deployment package 116 can convert the first response 318 into a format that is amenable to the client application 304. The API deployment package 116 can then transmit this formatted response as the second response 320 to the client application 304.

FIG. 4 is an illustration of an example OAS document, according to one or more embodiments. As indicated above, the OAS document 104 can define an API structure in a particular format. The OAS document 104 can be written in either JSON, YAML, or other appropriate language. It should be appreciated the OAS document 104 illustrated in FIG. 4 is an example and another OAS document 104 generated for a different purpose, but using the techniques described herein, can be configured differently. The OAS document 104 illustrated in FIG. 4 is for an API to assist with an enterprise's inventory search. As illustrated, the OAS document 104 conforms to OAS 3.0.0. The title of the OAS document 104 is inventory API proxy and the version of inventory API proxy is 1.0.0. A description of the API proxy includes an API proxy for managing a digital inventory. The name of the enterprise team in charge is inventory team. An email address for the inventor team can be inventory@example.com. A URL for the API proxy's server is https://api.example.com/v1.

The OAS document 104 can include a paths section, which can define a file path as "/inventory." The operation identifier for a get operation is defined as "getInventory." A summary of the get operation includes to retrieve all inventory items. The OAS document 104 further defines the schema as a JSON format and defines the structure of the inventory items as an array.

The OAS document 104 further includes a post section, which can be an HTTP method that can be used to generate a new resource and is supported by the API proxy. As illustrated, the HTTP method is adding a new item to the inventory. Furthermore, the OAS document 104 defines the responses that can be provided in response to an add inventory item request. As illustrated, the responses can include "inventory item created successfully," "invalid input," and "internal server error." The OAS document 104 can include additional information such as components including schemas that define, for example, the structure of an inventory item, the quantity of an inventory item, and the price for an inventory item.

As described, the OAS document 104 can be generated by the OAS document generator 222 using the API outline 216 as described with respect to FIG. 2. The OAS document can further be used to generate an API proxy 112 as described with respect to FIG. 1.

FIG. 5 is an illustration 500 of an example API outline, according to one or more embodiments. As indicated above, the API outline 216 can be useful as a resource document or collection of resource documents that can be accessed for information to be used to generate the OAS document 104. The API outline 216 can include plain language and provide stakeholders (e.g., support group for a resource) an understanding of the intent of the API proxy 112. The illustrated API outline 216 is an example relating back to the OAS document 104 of FIG. 4. The API outline 216 of FIG. 5 provides an example of an API outline that could be used by an OAS document generator 222 to generate the OAS document 104. As the embodiments herein can be used to generate different API deployment packages based on different inputs, a different API description 202 can result in a different API outline 216. The API outline 216 can include an intended base URL for the API deployment package 116 (e.g., https://api.example.com/v1). The API outline 216 can further indicate intended post requests (e.g., an HTTP POST request) that can be sent to an endpoint. As illustrated, the post request relates back to the request to add an inventory item from FIG. 4. The API outline 216 can include a data model intended to be used for the API deployment package 116. As illustrated, the data model defines an inventor item identifier, "id," as a string, an inventory item name, "name," as a string, an inventory item quantity, "quantity," as an integer, and an inventory item price "price." The API outline 216 also indicates an intended authentication process. As illustrated, the intended authentication process is to use API keys in the headers of a request for authentication. The API outline 216 also indicates how errors are to be handled. As illustrated, the intended error handling is for the API deployment package 116 to return the appropriate HTTP status codes (e.g., 400 Bad Request or 500 Internal Server Error).

As illustrated in FIG. 2, the API outline 216 can be generated by the computing system 102 using information from the features, stories generator 212, the first model 212, and the second model 214. The API outline 216 can be accessed by the OAS document generator 222 and used to generate the OAS document 104.

Figure 6:
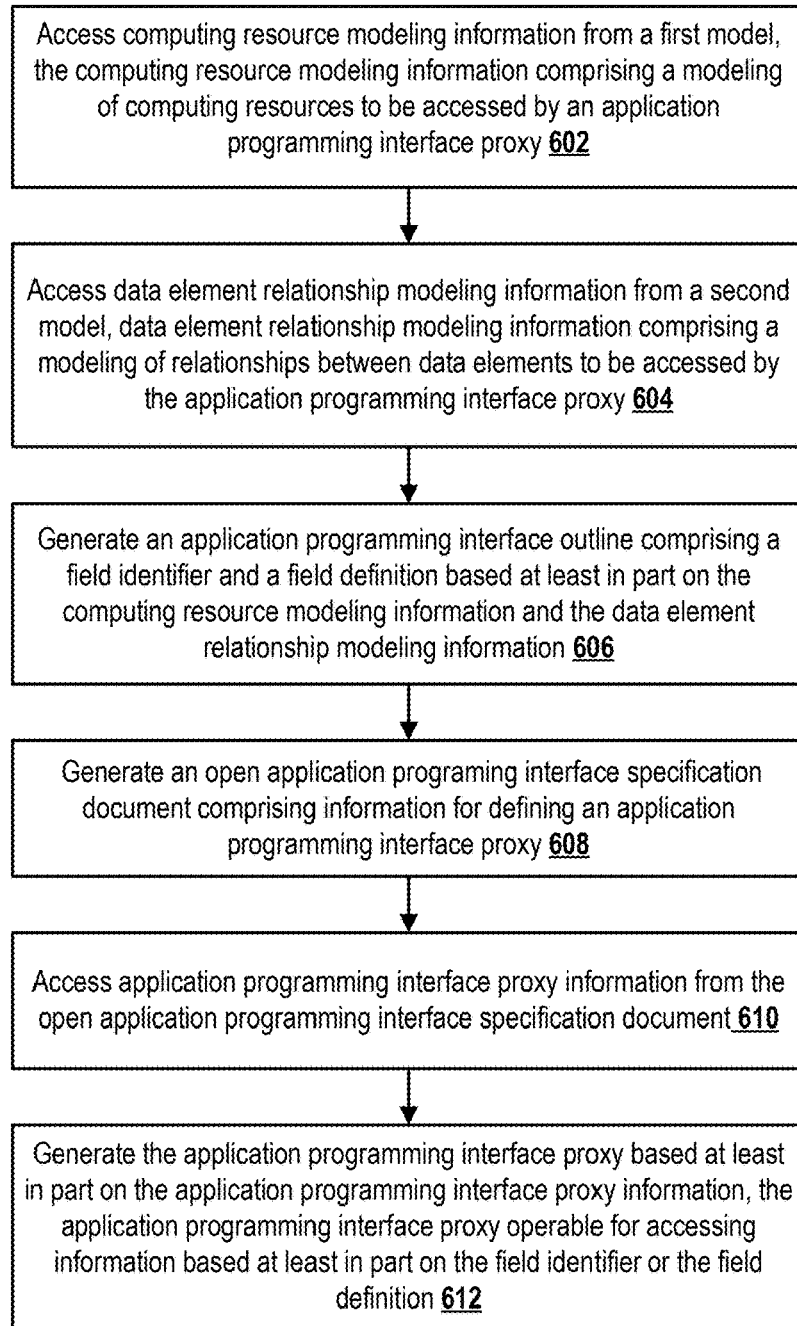
FIG. 6 is an example process flow for generating an API proxy, according to one or more embodiments.

FIG. 6 is an example process flow 600 for generating an API proxy, according to one or more embodiments. Process 600 (described below) is illustrated as a process flow, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 602, he process 600 includes a computing system (e.g., computing system 102) accessing computing resource modeling information from a first model (e.g., first model 212), the computing resource modeling information may include a modeling of computing resources to be accessed by an application programming interface proxy. The computing resource modeling information can be an output of the first model and be accessed via a convertor (e.g., first model convertor 218).

At block 604, the process 600 can include the computing system accessing data element relationship modeling information from a second model, data element relationship modeling information including a modeling of relationships between data elements to be accessed by the application programming interface proxy. The computing resource modeling information can be an output of a model (e.g., second model 214) and be accessed via a convertor (e.g., second model convertor 220).

At block 606, the process 600 can include the computing system generating an API outline (e.g., API outline 216) including a field identifier and a field definition based at least in part on the computing resource modeling information and the data element relationship modeling information. In addition to the computing resource modeling information and data element modeling information, the computing system can access information from API description (e.g., API description 202). The API description information can include, for example, configuration items for an API proxy, such as relationships between hardware resources, software resources, and network resources. The computing system can further generate the API outline based at least in part on the information from the API description.

At block 608, the process 600 can include the computing system generating an OAS document including information for defining an application programming interface proxy. Referring back to FIG. 4, the information can include, for example, the info, the servers, the paths, and the post. As indicated above, the OAS document may include more information than is necessary to generate the API proxy. Therefore, at block 608, the computing system can determine whether to use additional information from the OAS document (e.g., OAS document 104) for generating the API proxy. The additional information can include information that is not necessary for a computing system to generate the API proxy. For example, referring back to FIG. 4, the description "API proxy for managing a digital inventory" may not be used for the generating the API Proxy. This description information may be useful for a human reader to understand the intent of the API proxy, but not useful for a computing system to generate the API proxy. Therefore, the computing system may determine to not use this description information. In the event that the computing system determines not to use the additional information, the computing system can discard the additional information from the OAS document.

At block 610, the process 600 can include the computing system accessing API proxy information from the OAS document. Referring back to FIG. 4, the OAS document includes information, such as a URL of a server that is to host the API proxy (e.g., https://api.example.com/v1. The OAS document may further include a file path (e.g., /inventory) to be used for the API proxy. The OAS document may further define a schema type (e.g., array) for information to be accessed by the API proxy. The OAS document can further include an action that can be performed by the API proxy (e.g., addInventoryItem). It should be appreciated that FIG. 4 is for illustrative purposes and in a practical real-world example, the OAS document can include different or more pieces of information that can be used to generate an API proxy.

At 612, the process 600 can include the computing system generating an API proxy based at least in part on the API proxy information. A frontend service can make a call to the API proxy to make request for a backend service. The call can include information to process a request for the backend service. The API proxy can use a field identifier and a field definition to process the information received from the frontend service. Based on the processing, the API proxy can make a call to a backend service to fulfill the frontend service's request.

In some embodiments, in addition to the computing system generating the API proxy (as described at 612), the process 600 may further include the computing system generating backend service code (e.g., backend service code 128). Generating the backend service code can include the computing system structuring data for the backend service to be accessible via the API proxy based at least in part on the OAS document. In this embodiment, the process 600 may further include the computing system determining an endpoint (e.g., URL) for accessing the structured data by the API proxy. In some embodiments, after generating the backend service code, the computing system can receive a policy for the code. The policy can include rules to be implemented in the backend service code. For example, the policy can include access restrictions to data stored by a backend service (e.g., employee access level for accessing data stored in a backend service). As another example, the policy can define computing resources that may be used in association with the API proxy (e.g., an amount of network bandwidth that the API proxy may use at a given time). In these embodiments, the computing system can generate a second backend service code for the backend service that implements the policy. The second backend service code can be an updated version of the backend service code described above. If implementing the policy into the backend service code requires a significant update, the second backend service code can be an entirely new code.

The computing system can further deploy the API proxy to a server and activate an HTTP endpoint for accessing the first application programming interface proxy. The API proxy with the activated endpoint can be considered an API deployment package (e.g., API deployment package 116).

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory.

In an illustrative example, a banking organization's computing system can be accessed by various banking subsystems, such as an accounts subsystem for managing day-to-day account transactions, a customer relationship management (CRM) subsystem for managing customer relationships, an online and mobile banking subsystem for managing digital banking services, a fraud prevention subsystem for managing fraud prevention activities, and other appropriate banking subsystem. Each of these systems may, from time to time, access one or more of the banking organization's backend services (e.g., backend services 314) for performing one or more banking function. The techniques described herein are subsystem agnostic. Therefore, each of the banking subsystems (e.g., account system, CRM subsystem, online and mobile banking subsystem, fraud prevention subsystem) can independently use the techniques described herein to generate an API proxy (e.g., API proxy 112) and backend services code (e.g., backend services code 128) that is tailored for the respective subsystem.

Figure 7:
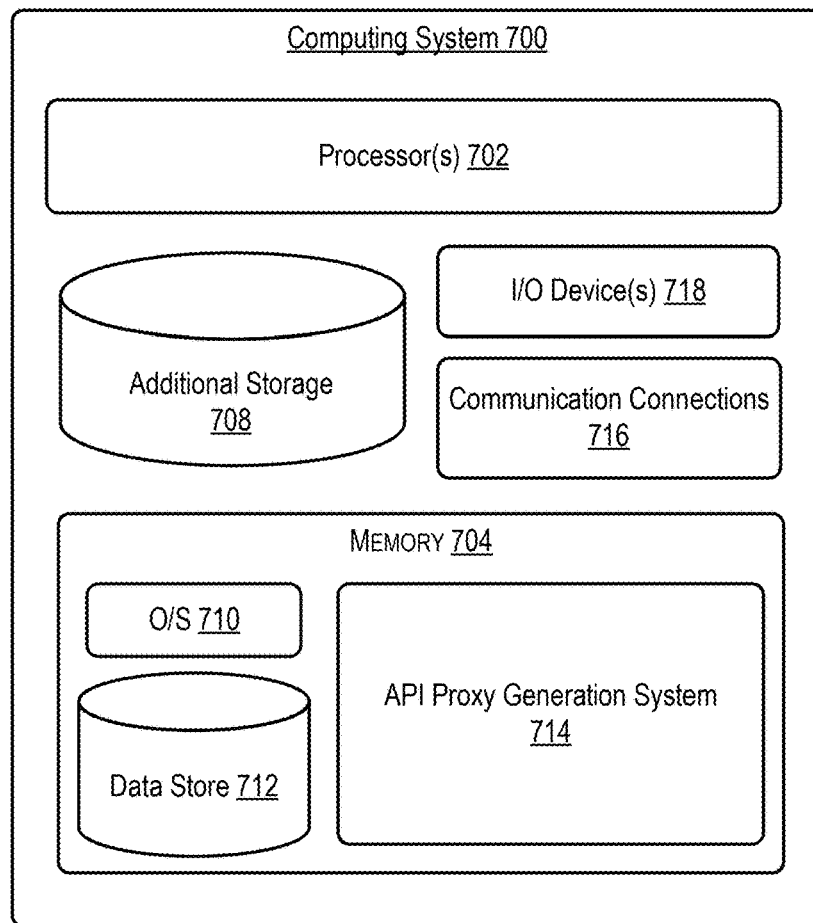
FIG. 7 illustrates an example computing system that may implement the methods disclosed herein.

FIG. 7 illustrates an example computing system 700 that may implement the methods disclosed herein. In some embodiments, the computing system 700 (e.g., computing system 102) may include one or more processors (e.g., processor(s) 702). The processor(s) 702 may be implemented in hardware, computer-executable instructions, firmware, or combinations thereof. Computer-executable instruction or firmware implementations of the processor(s) 702 may include computer-executable or machine-executable instructions written in any suitable programming language.

Computing system 700 may include memory 704. The memory 704 may store computer-executable instructions that are loadable and executable by the processor(s) 702, as well as data generated during the execution of these programs. The memory 704 may be volatile (such as RAM) and/or non-volatile (such as ROM, flash memory, etc.). The computing system 700 may include additional storage 706, which may include removable storage and/or non-removable storage. The additional storage 706 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 704 or additional storage 706 may individually, or collectively, include multiple different types of memory, such as SRAM, DRAM, or ROM.

The memory 704 and/or additional storage 704 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 704 and the additional storage 704 are examples of computer storage media. Memory 704 and/or additional storage 704 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing system 700. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 704 may include an operating system 708 and one or more data stores 810, and/or one or more application programs, modules, or services for implementing the features disclosed herein, such as the features provided by the API proxy generation system 714 (computing system 102 of FIG. 1 and computing system 102 of FIG. 2).

The computing device may also contain communications connection(s) 716 that allow the computing system 700 to communicate with a stored database, another computing device, a server, user terminals and/or other devices (e.g., via one or more networks, not depicted). The computing device may also include I/O device(s) 718, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining, by a computing system, a backend service application programming interface with which to interface via an application programming interface proxy;
   accessing, by the computing system, an open application programming interface specification document comprising information for defining the application programming interface proxy;
   determining, by the computing system, a subset of the information from the open application programming interface specification document to be used to generate the application programming interface proxy based at least in part on the backend service application programming interface; and generating, by the computing system, the application programming interface proxy based at least on part on the subset of the information.

2. The computer-implemented method of claim 1, wherein determining the subset of the information from the open application programming interface specification document to be used to generate the application programming interface proxy comprises:
tokenizing information included in the open application programming interface specification document; and
determining a relationship between a first information section of the open application programming interface specification document and a second information section of the open application programming interface specification document based at least in part on tokenizing the information included in the open application programming interface specification document, wherein generating the application programming interface proxy is based at least in part on determining the relationship between the first information section of the open application programming interface specification document and the second information section of the open application programming interface specification document.

3. The computer-implemented method of claim 1, wherein the method further comprises:
determining a task to be performed by the application programming interface proxy, wherein generating the application programming interface proxy is based at least in part on determining the task to be performed by the application programming interface proxy.

4. The computer-implemented method of claim 1, wherein the method further comprises:
structuring the subset of the information in a YAML Ain't Markup Language format, wherein generating the application programming interface proxy is based at least in part on structuring the information in a YAML Ain't Markup Language format.

5. The computer-implemented method of claim 1, wherein the information comprises:
an endpoint to be used for accessing the backend service application programming interface.

6. The computer-implemented method of claim 1, wherein the method further comprises:
generating an application programming interface outline comprising a field identifier and a field definition based at least in part on computing resource modeling information; and
generating the open application programming interface specification document comprising information for defining the application programming interface proxy based at least in part on the application programming interface outline.

7. The computer-implemented method of claim 1, wherein the method further comprises:
structuring data for a backend service code to be accessible via the backend service application programming interface.

8. A computing system comprising:
one or more processors; and
one or more non-transitory, computer-readable media comprising a sequence of instructions that, when execute, cause the one or more processors to:
determine a backend service application programming interface with which to interface via an application programming interface proxy;
access an open application programming interface specification document comprising information for defining the application programming interface proxy;
determine a subset of the information from the open application programming interface specification document to be used to generate the application programming interface proxy based at least in part on the backend service application programming interface; and
generate the application programming interface proxy based at least on part on the subset of the information.

9. The computing system of claim 8, wherein determining the subset of the information from the open application programming interface specification document to be used to generate the application programming interface proxy comprises:
tokenizing information included in the open application programming interface specification document; and
determining a relationship between a first information section of the open application programming interface specification document and a second information section of the open application programming interface specification document, wherein generating the application programming interface proxy is based at least in part on determining the relationship between the first information section of the open application programming interface specification document and the second information section of the open application programming interface specification document.

10. The computing system of claim 8, wherein the sequence of instructions that, when execute, further cause the one or more processors to:
determine a task to be performed by the application programming interface proxy, wherein generating the application programming interface proxy is based at least in part on determining the task to be performed by the application programming interface proxy.

11. The computing system of claim 8, wherein the sequence of instructions that, when execute, further cause the one or more processors to:
structure the subset of the information in a YAML Ain't Markup Language format, wherein generating the application programming interface proxy is based at least in part on structuring the information in a YAML Ain't Markup Language format.

12. The computing system of claim 8, wherein the information comprises:
an endpoint to be used for accessing the backend service application programming interface.

13. The computing system of claim 8, wherein the sequence of instructions that, when execute, further cause the one or more processors to:
generate an application programming interface outline comprising a field identifier and a field definition based at least in part on computing resource modeling information; and
generate the open application programming interface specification document comprising information for defining the application programming interface proxy based at least in part on the application programming interface outline.

14. The computing system of claim 8, wherein the sequence of instructions that, when execute, further cause the one or more processors to:

structure data for a backend service code to be accessible via the backend service application programming interface.

15. One or more non-transitory, computer-readable media comprising a sequence of instructions that, when executed, cause one or more processors to:
   determine a backend service application programming interface with which to interface via an application programming interface proxy;
   access an open application programming interface specification document comprising information for defining the application programming interface proxy;
   determine a subset of the information from the open application programming interface specification document to be used to generate the application programming interface proxy based at least in part on the backend service application programming interface; and
   generate the application programming interface proxy based at least on part on the subset of the information.

16. The one or more non-transitory, computer-readable media of claim 15, wherein determining the subset of the information from the open application programming interface specification document to be used to generate the application programming interface proxy comprises:
   tokenizing information included in the open application programming interface specification document; and
   determining a relationship between a first information section of the open application programming interface specification document and a second information section of the open application programming interface specification document, wherein generating the application programming interface proxy is based at least in part on determining the relationship between the first information section of the open application programming interface specification document and the second information section of the open application programming interface specification document.

17. The one or more non-transitory, computer-readable media of claim 15, wherein the sequence of instructions that, when execute, further cause the one or more processors to:
   determine a task to be performed by the application programming interface proxy, wherein generating the application programming interface proxy is based at least in part on determining the task to be performed by the application programming interface proxy.

18. The one or more non-transitory, computer-readable media of claim 15, wherein the sequence of instructions that, when execute, further cause the one or more processors to:
   structure the subset of the information in a YAML Ain't Markup Language format, wherein generating the application programming interface proxy is based at least in part on structuring the information in a YAML Ain't Markup Language format.

19. The one or more non-transitory, computer-readable media of claim 15, wherein the information comprises:
   an endpoint to be used for accessing the backend service application programming interface proxy.

20. The one or more non-transitory, computer-readable media of claim 15, wherein the sequence of instructions that, when execute, further cause the one or more processors to:
   generate an application programming interface outline comprising a field identifier and a field definition based at least in part on computing resource modeling information; and
   generate the open application programming interface specification document comprising information for defining the application programming interface proxy based at least in part on the application programming interface outline.

* * * * *